United States Patent
Huang (10) Patent No.: US 12,026,321 B2
(45) Date of Patent: Jul. 2, 2024

(54) PORTABLE COMPUTER DEVICE AND KEYBOARD HAVING WIRELESS TRANSCEIVER

(71) Applicant: DARFON ELECTRONICS CORP., Taoyuan (TW)

(72) Inventor: Heng-Yi Huang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/134,562

(22) Filed: Apr. 13, 2023

(65) Prior Publication Data

US 2023/0333666 A1 Oct. 19, 2023

Related U.S. Application Data

(60) Provisional application No. 63/331,263, filed on Apr. 15, 2022.

(30) Foreign Application Priority Data

Mar. 21, 2023 (TW) .................................. 112110446

(51) Int. Cl.
G06F 3/02 (2006.01)
(52) U.S. Cl.
CPC .................................. *G06F 3/0202* (2013.01)
(58) Field of Classification Search
CPC ...................................................... G06F 3/0202
USPC ....................................................... 345/169
See application file for complete search history.

(56) References Cited

U.S. PATENT DOCUMENTS

| 2013/0328741 | A1 | 12/2013 | Degner | |
| 2016/0183034 | A1* | 6/2016 | Konanur | H04B 5/0081 |
| | | | | 455/41.1 |
| 2019/0371538 | A1* | 12/2019 | Huang | G02B 6/0068 |
| 2020/0073484 | A1* | 3/2020 | Garelli | G06F 3/0393 |

FOREIGN PATENT DOCUMENTS

| TW | I492258 B | 7/2015 |
| TW | M519818 U | 4/2016 |

* cited by examiner

*Primary Examiner* — Long D Pham
(74) *Attorney, Agent, or Firm* — Winston Hsu (57) ABSTRACT

A portable computer device includes a computer body, a keyboard, a backlight circuit board and a metal layer. The computer body has a wireless transceiver and a system ground terminal. The keyboard is mounted on the computer body. The backlight circuit board is disposed under the keyboard and is electrically connected to the computer body. The backlight circuit board has a plurality of light sources and a circuit trace. The circuit trace is electrically connected to the plurality of light sources. The wireless transceiver is located at a side of the backlight circuit board. The metal layer is formed on a position of the backlight circuit board where there is no circuit trace and is adjacent to the wireless transceiver. The metal layer is electrically connected to the system ground terminal for suppressing electromagnetic interference of the backlight circuit board to the wireless transceiver.

8 Claims, 6 Drawing Sheets

PORTABLE COMPUTER DEVICE AND KEYBOARD HAVING WIRELESS TRANSCEIVER

CROSS REFERENCE TO RELATED APPLICATIONS

This application claims the benefit of U.S. Provisional Application No. 63/331,263, filed on Apr. 15, 2022. The content of the application is incorporated herein by reference.

BACKGROUND OF THE INVENTION

1. Field of the Invention

The present invention relates to a portable computer device and a keyboard thereof, and more specifically, to a portable computer device having a metal layer formed on a position of a backlight circuit board where there is no circuit trace for suppressing electromagnetic interference of the backlight circuit board to a wireless transceiver and a keyboard thereof.

2. Description of the Prior Art

In general, for providing a keyboard of a portable computer device (e.g., a notebook) with a symbol lighting function, a conventional design is to dispose a backlight module under a bottom board of the keyboard. The backlight module includes a light guide plate and a backlight circuit board. The bottom board is disposed on the light guide plate and has holes formed thereon corresponding to a plurality of keyswitches of the keyboard. The backlight circuit board has a plurality of backlight sources corresponding to the plurality of keyswitches, and the backlight circuit board can perform power and brightness control operations on the backlight sources in a circuit signal control manner. Accordingly, the light guide plate can guide light emitted by the backlight sources to be incident to symbols on the keyswitches through the holes, so as to generate the symbol lighting effect. However, since the portable computer device usually adopts the design in which a wireless transceiver (e.g., an antenna or a RF (Radio Frequency) device) is disposed at a side of the backlight module for providing a wireless signal transmission function, the backlight circuit board may cause EMI (Electromagnetic Interference) to wireless signal transmission of the wireless transceiver, so as to influence the wireless communication quality of the portable computer device.

SUMMARY OF THE INVENTION

The present invention provides a portable computer device including a computer body, a keyboard, a backlight circuit board, and a metal layer. The computer body has a wireless transceiver and a system ground terminal. The keyboard is mounted on the computer body. The backlight circuit board is disposed under the keyboard and electrically connected to the computer body. The backlight circuit board has a plurality of light sources and a circuit trace electrically connected to the plurality of light sources. The wireless transceiver is located at a side of the backlight circuit board. The metal layer is formed on a position of the backlight circuit board where there is no circuit trace. The metal layer is adjacent to the wireless transceiver and electrically connected to the system ground terminal for suppressing electromagnetic interference of the backlight circuit board to the wireless transceiver.

The present invention further provides a keyboard mounted on a computer body. The computer body has a wireless transceiver and a system ground terminal. The keyboard includes a bottom board, a backlight circuit board, and a metal layer. The backlight circuit board is disposed under the bottom board and electrically connected to the computer body. The backlight circuit board has a plurality of light sources and a circuit trace electrically connected to the plurality of light sources, wherein the wireless transceiver is located at a side of the backlight circuit board. The metal layer is formed on a position of the backlight circuit board where there is no circuit trace. The metal layer is adjacent to the wireless transceiver and electrically connected to the system ground terminal for suppressing electromagnetic interference of the backlight circuit board to the wireless transceiver.

These and other objectives of the present invention will no doubt become obvious to those of ordinary skill in the art after reading the following detailed description of the preferred embodiment that is illustrated in the various figures and drawings.

DETAILED DESCRIPTION

The present invention winnow be described more specifically with reference to the following embodiments. The advantages and spirit of the invention can be further understood in view of the detailed descriptions and the accompanying drawings. The present invention can be implemented or applied to other different embodiments. Certain aspects of the present invention are not limited by the particular details of the examples illustrated herein. Without departing from the spirit and scope of the invention, the present invention will have other modifications and changes. It should be understood that the appended drawings are not necessarily drawn to scale and the relative position is merely illustrative, not presenting an actual condition of the embodiments.

Figure 1:
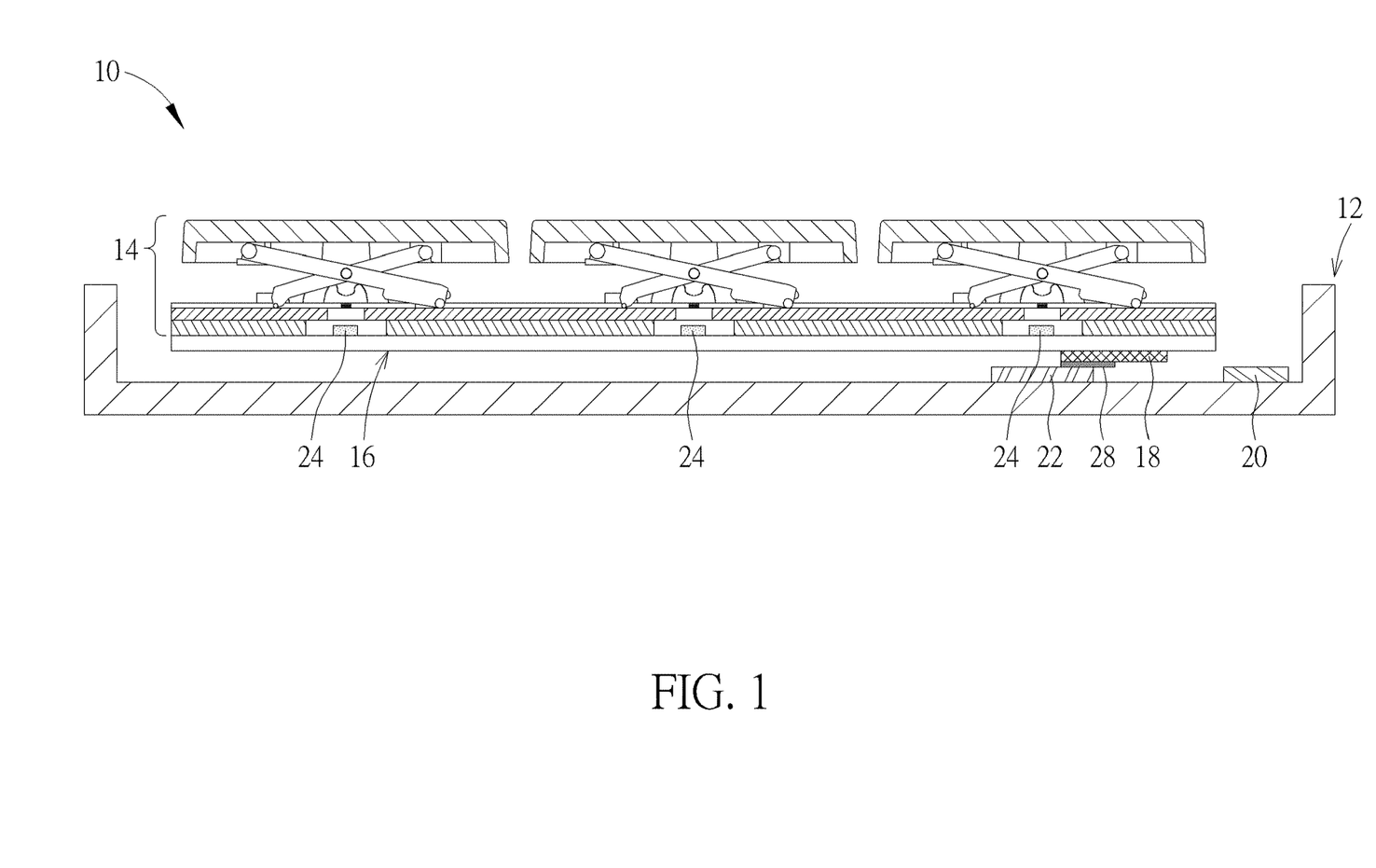
FIG. 1 is a cross sectional diagram of a portable computer device according to an embodiment of the present invention.

Please refer to FIG. 1, which is a cross sectional diagram of a portable computer device 10 according to an embodiment of the present invention. The portable computer device 10 could be preferably a foldable computer apparatus composed of an upper cover and a lower casing or a computer apparatus having a keyswitch input function (e.g., a notebook, but not limited thereto). The portable computer device 10 can provide a symbol lighting function. For clearly showing the metal layer design of the portable computer device 10, a computer body 12 could be only depicted by a simple frame structure in FIG. 1 (but not limited thereto), and a keyboard 14 is briefly depicted in a three key configuration. As shown in FIG. 1, the portable computer device 10 includes the computer body 12, the keyboard 14, a backlight circuit board 16, and a metal layer 18. The computer body 12 has a wireless transceiver 20 (preferably an antenna or a radio frequency device, but not limited thereto) and a system ground terminal 22 for providing a grounding function. As for the related description for other components (e.g., a main casing, a CPU (Central Processing Unit), a hard disk drive, and a motherboard) of the computer body 12, it is commonly seen in the prior art and omitted herein. The keyboard 14 is mounted on the computer body 12 such that a user can press keyswitches of the keyboard 14 to execute a desired input function, and the related description for components (e.g., a bottom board, a keycap, an elastic returning member, and a membrane circuit board) of the keyboard 14 is commonly seen in the prior art and omitted herein.

Figure 2:
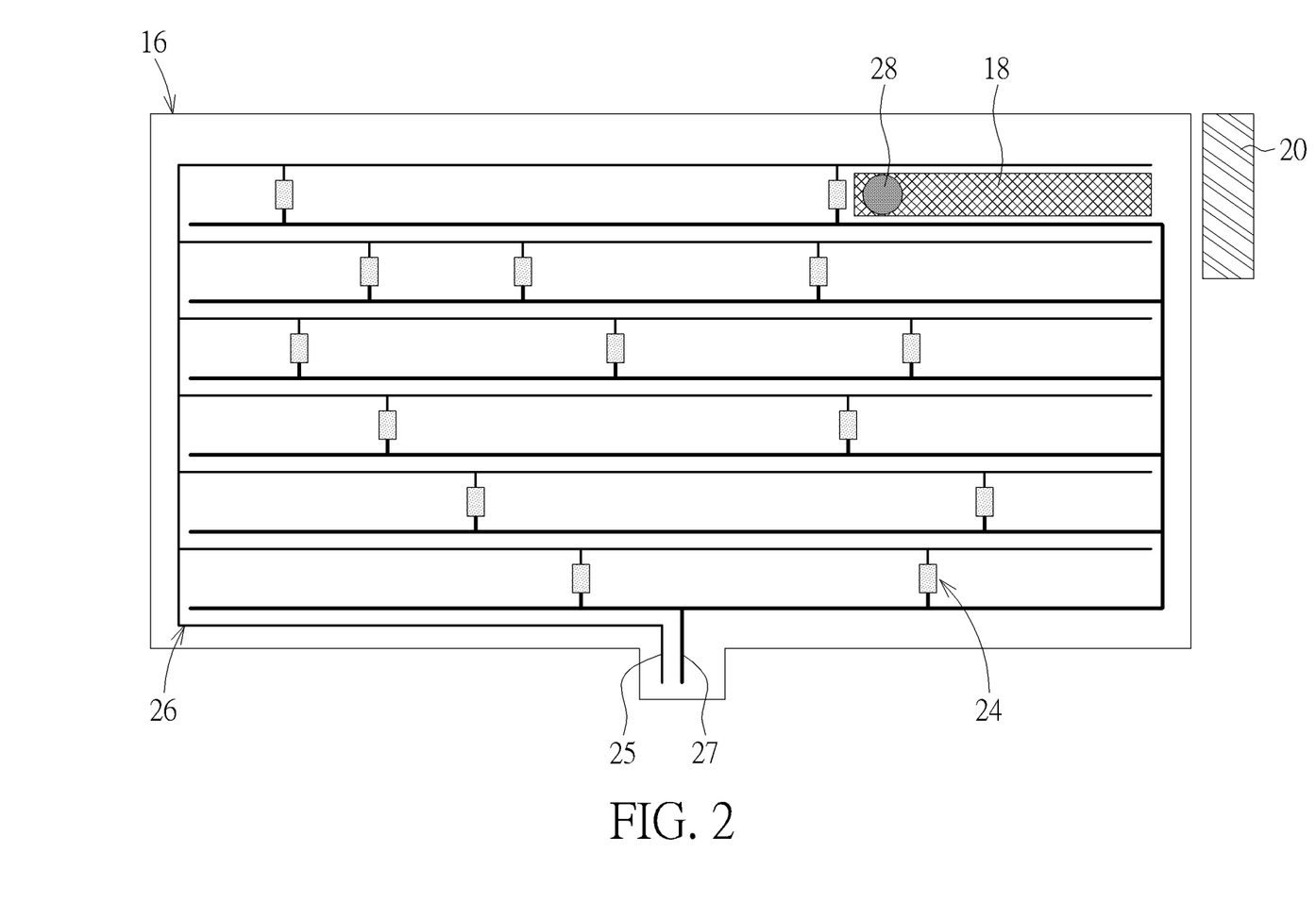
FIG. 2 is a top view of a backlight circuit board, a metal layer and a wireless transceiver in FIG. 1.

More detailed description for the grounding design of the metal layer 18 is provided as follows. Please refer to FIG. 1 and FIG. 2. FIG. 2 is a top view of the backlight circuit board 16, the metal layer 18 and the wireless transceiver 20 in FIG. 1. As shown in FIG. 1 and FIG. 2, the backlight circuit board 16 is disposed under the keyboard 14 and is electrically connected to the computer body 12, and the backlight circuit board 16 has a plurality of light sources 24 (e.g., light emitting diodes, but not limited thereto) and a circuit trace 26, wherein the circuit trace 26 is only depicted by a simple circuitry including a positive trace 25 and a negative trace 27 in FIG. 2, but the present invention is not limited thereto. The circuit trace 26 is electrically connected to the plurality of light sources 24, and the wireless transceiver 20 is located a side of the backlight circuit board 16 to provide the computer body 12 with a wireless signal transmission function. The metal layer 18 is formed on a position of the backlight circuit board 16 where there is no circuit trace 26 (as shown in FIG. 2) and is adjacent to the wireless transceiver 20. The metal layer 18 is electrically connected to the system ground terminal 22. To be more specific, in this embodiment, the metal layer 18 could have a contact point 28 corresponding to the system ground terminal 22. In such a manner, as shown in FIG. 1 and FIG. 2, when the keyboard 14 and the backlight circuit board 16 are mounted on the computer body 12, the contact point 28 can directly contact the system ground terminal 22 to complete electrical connection and grounding between the metal layer 18 and the system ground terminal 22.

Via the aforesaid configuration that the metal layer 18 is disposed on the position of the backlight circuit board 16 where there is no circuit trace 26 and is adjacent to the wireless transceiver 20 and the grounding design that the metal layer 18 is electrically connected to the system ground terminal 22, the metal layer 18 can generate a metal shielding effect on the wireless transceiver 20 to effectively shield electromagnetic interference signals transmitted from the backlight circuit board 16, so as to suppress electromagnetic interference of the backlight circuit board 16 to the wireless transceiver 20. In such a manner, the present invention can efficiently solve the prior art problem that the backlight circuit board may cause EMI to wireless signal transmission of the wireless transceiver, so as to greatly improve the wireless communication quality of the portable computer device.

Figure 3:
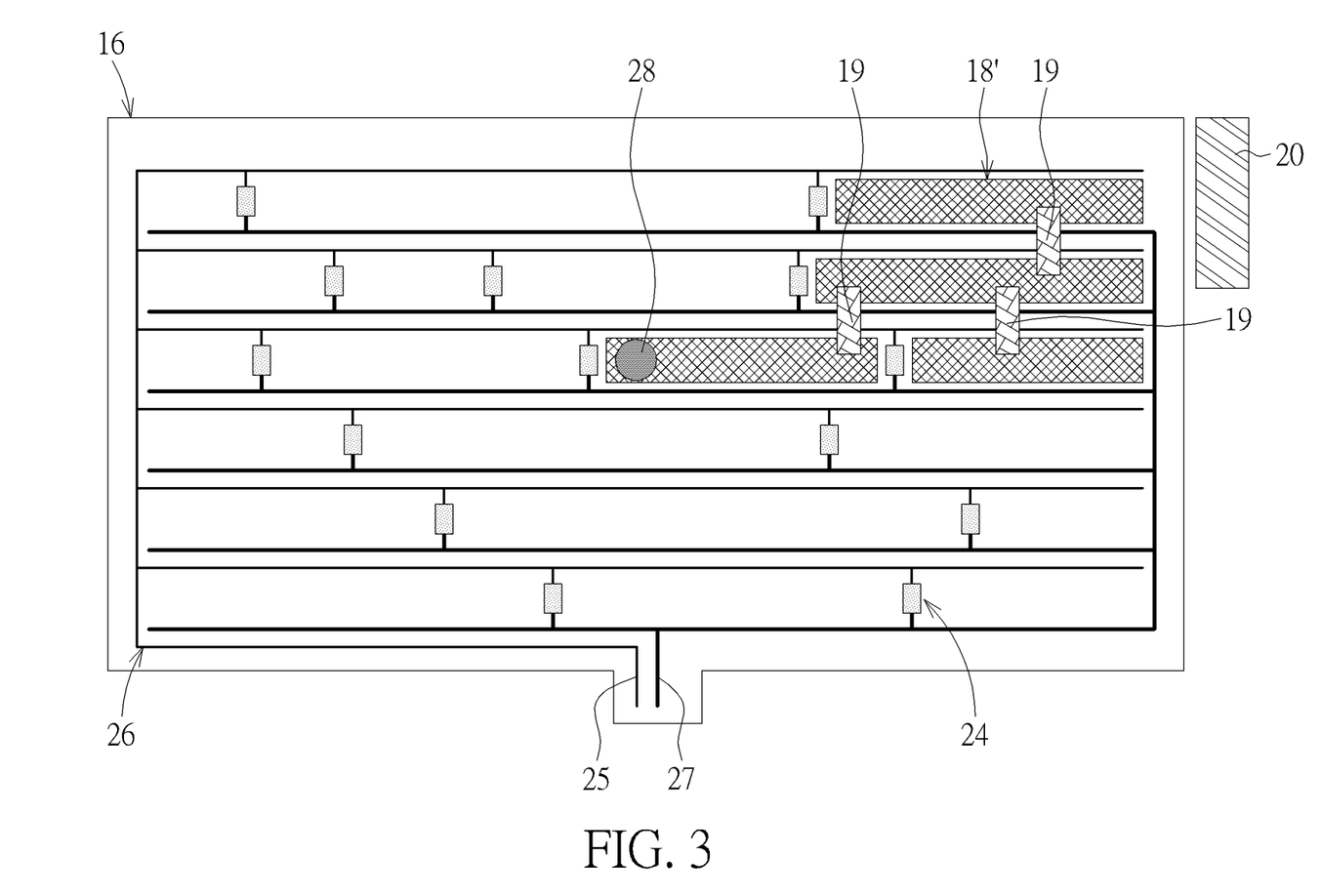
FIG. 3 is a top view of the backlight circuit board, a metal layer, and the wireless transceiver according to another embodiment of the present invention.

It should be mentioned that the metal layer design is not limited to the aforesaid embodiment. For example, please refer to FIG. 3, which is a top view of the backlight circuit board 16, a metal layer 18', and the wireless transceiver 20. Components both mentioned in this embodiment and the aforesaid embodiment represent components with similar structures or functions, and the related description is omitted herein. As shown in FIG. 3, in the embodiment that it is necessary to extend the layout area of the metal layer to be connected to the system ground terminal or to improve the metal shielding effect, the metal layer 18' is formed on a position of the backlight circuit board 16 where there is no circuit trace 26 and could have at least one jumper structure 19 (three shown in FIG. 3, but not limited thereto). Accordingly, the metal layer 18' can be insulated across the circuit trace 26 via the jumper structure 19 (preferably insulated by ultraviolet curing glue, but not limited thereto), so as to prevent the metal layer 18' from contacting the circuit trace 26 to cause short circuit of the backlight circuit board 16.

Figure 4:
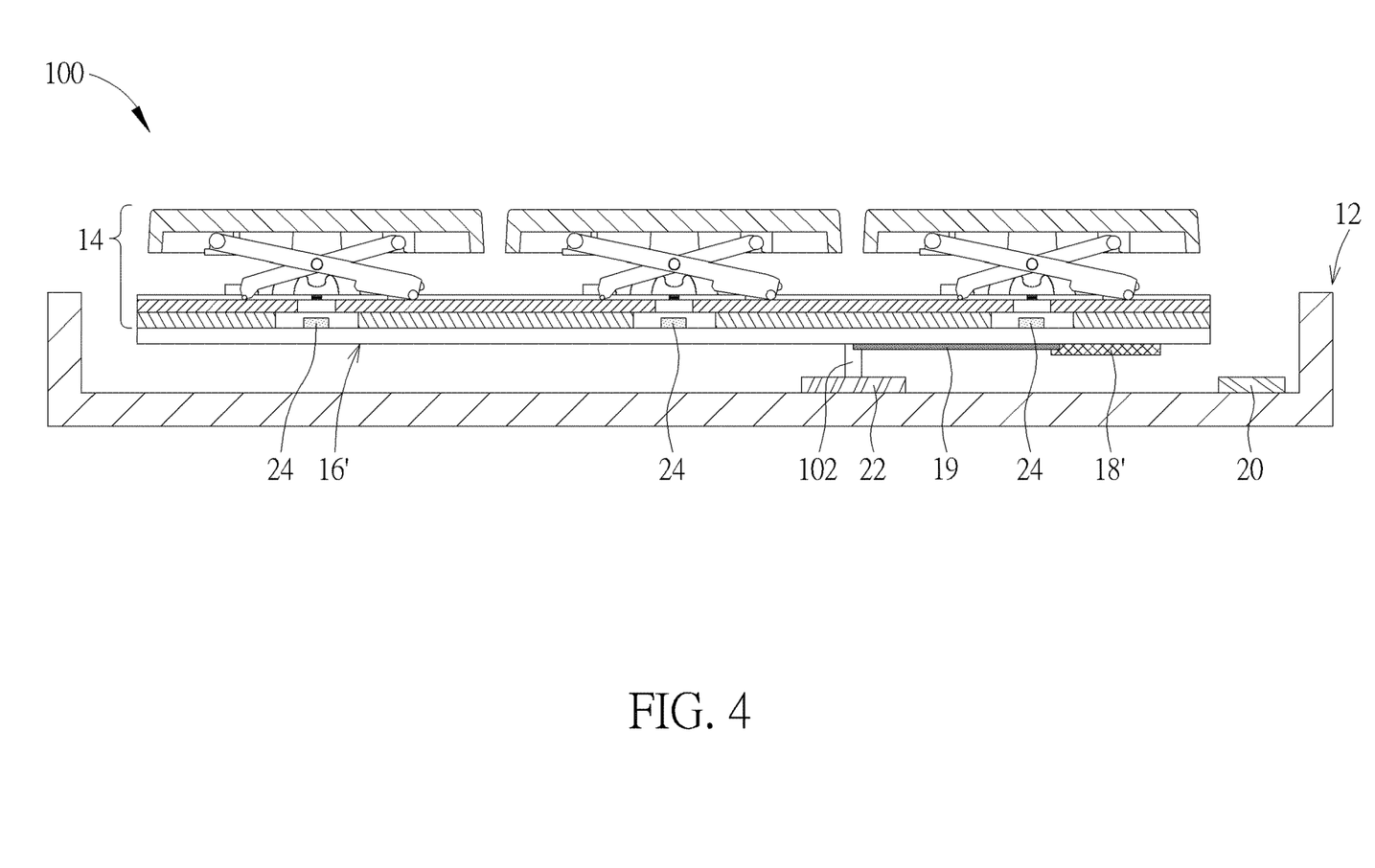
FIG. 4 is a cross-sectional diagram of a portable computer device according to another embodiment of the present invention.
Figure 5:
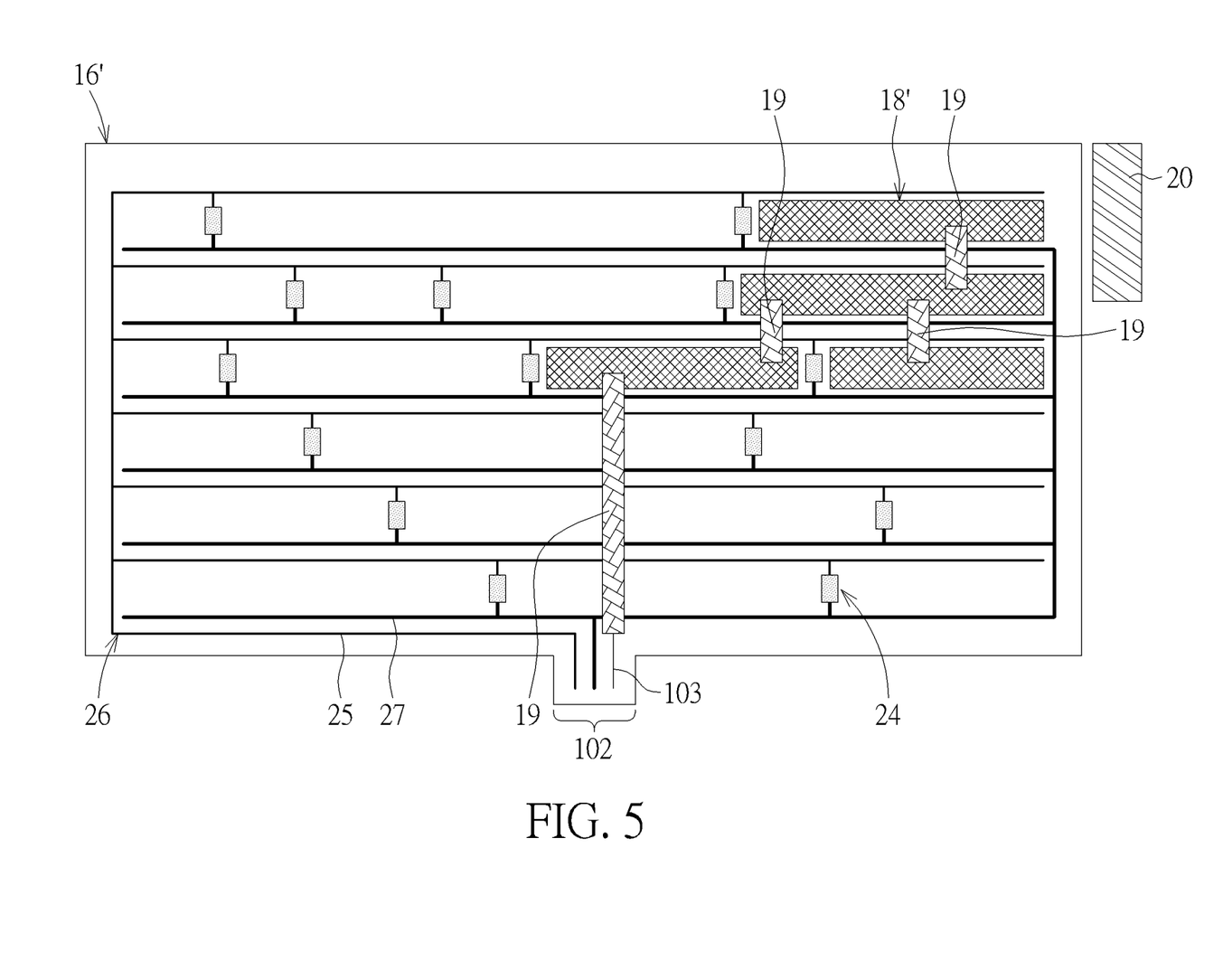
FIG. 5 is a top view of a backlight circuit board, the metal layer and the wireless transceiver in FIG. 4.

Moreover, the electrical connection design of the metal layer and the system ground terminal is not limited to the aforesaid embodiments, meaning that the present invention could adopt the connector design in another embodiment. For example, please refer to FIG. 4 and FIG. 5. FIG. 4 is a cross-sectional diagram of a portable computer device 100 according to another embodiment of the present invention. FIG. 5 is a top view of a backlight circuit board 16', the metal layer 18' and the wireless transceiver 20 in FIG. 4. Components both mentioned in this embodiment and the aforesaid embodiment represent components with similar structures or functions, and the related description is omitted herein. The portable computer device 100 could be preferably a foldable computer apparatus composed of an upper cover and a lower casing or a computer apparatus having a keyswitch input function (e.g., a notebook, but not limited thereto). The portable computer device 100 can provide a symbol lighting function. As shown in FIG. 4 and FIG. 5, the portable computer device 100 could include the computer body 12, the keyboard 14, a backlight circuit board 16' and the metal layer 18'. The backlight circuit board 16' is disposed under the keyboard 14 and is electrically connected to the computer body 12. The backlight circuit board 16' has the plurality of light sources 24 and the circuit trace 26 and has a connector 102 (e.g., a FPC (Flexible Printed Circuit) connector, but not limited thereto) corresponding to the system ground terminal 22. The connector 102 could have a ground trace 103 and is connected to the metal layer 18' via the jumper structure 19. Accordingly, when the keyboard 14 and the backlight circuit board 16' are mounted on the computer body 12, the connector 102 can be electrically connected to the system ground terminal 22 for completing electrical connection and grounding between the metal layer 18' and the system ground terminal 22, so as to generate the effect that electromagnetic interference of the backlight circuit board 16' to the wireless transceiver 20 can be suppressed by the metal layer 18'.

Figure 6:
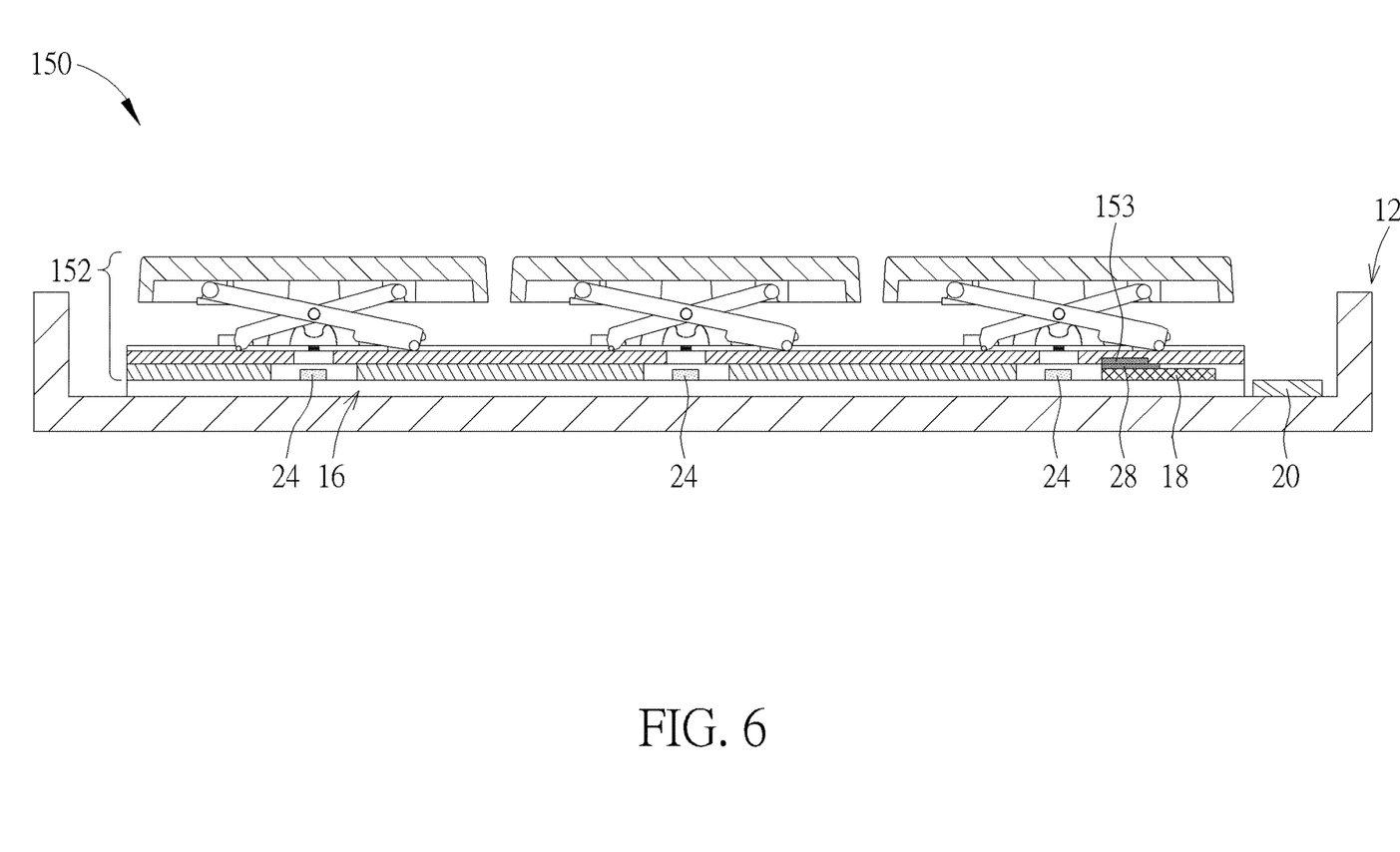
FIG. 6 is a cross-sectional diagram of a portable computer device according to another embodiment of the present invention.

In addition, the present invention could adopt the design that the metal layer is grounded via a keyboard ground terminal. For example, please refer to FIG. 6, which is a cross-sectional diagram of a portable computer device 150 according to another embodiment of the present invention. For clearly showing the metal layer design of the portable computer device 150, the computer body 12 is only depicted by a simple frame structure in FIG. 6 (but not limited thereto), and a keyboard 152 is briefly depicted in a three key configuration. Components both mentioned in this embodiment and the aforesaid embodiment represent components with similar structures or functions, and the related description is omitted herein. The portable computer device 150 could be preferably a foldable computer apparatus composed of an upper cover and a lower casing or a computer apparatus having a keyswitch input function (e.g., a notebook, but not limited thereto). The portable computer device 150 can provide a symbol lighting function. As shown in FIG. 6, the portable computer device 150 could include the computer body 12, the keyboard 152, the backlight circuit board 16 and the metal layer 18. The keyboard 152 is mounted on the computer body 12 such that a user can press keyswitches on the keyboard 152 to execute a desired input function. The related description for components (e.g., a bottom board, a keycap, an elastic returning member and a membrane circuit board) of the keyboard 152 is commonly seen in the prior art and omitted herein. In this embodiment, the keyboard 152 could have a keyboard ground terminal 153 to be electrically connected to the system ground terminal 22 (not shown in FIG. 6). The metal layer 18 could have a contact point 28 corresponding to the keyboard ground terminal 153. Accordingly, when the keyboard 152 and the backlight circuit board 16 are mounted on the computer body 12, the contact point 28 can directly contact the keyboard ground terminal 153 and grounding between the metal layer 18 and the system ground terminal 22 can be completed via electrical connection between the keyboard ground terminal 153 and the system ground terminal 22, so as to generate the effect that electromagnetic interference of the backlight circuit board 16 to the wireless transceiver 20 can be suppressed by the metal layer 18. To be noted, the aforesaid jumper structure and connector designs could be also applied to this embodiment for enhancing flexibility of the present invention in the metal layer grounding design. As for the detailed description for the derived embodiments (e.g., the embodiment that the backlight circuit board 16 could have a connector corresponding to the keyboard ground terminal 153 to be electrically connected to the metal layer 18 and the keyboard ground terminal 153), it could be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable computer device comprising:
a computer body having a wireless transceiver and a system ground terminal;
a keyboard mounted on the computer body, the keyboard having a keyboard ground terminal;
a backlight circuit board disposed under the keyboard and electrically connected to the computer body, the backlight circuit board having a plurality of light sources and a circuit trace electrically connected to the plurality of light sources, wherein the wireless transceiver is located at a side of the backlight circuit board; and
a metal layer formed on a position of the backlight circuit board where there is no circuit trace, the metal layer being adjacent to the wireless transceiver and having a contact point formed thereon corresponding to the keyboard ground terminal, and the keyboard ground terminal being electrically connected to the contact point and the system ground terminal for suppressing electromagnetic interference of the backlight circuit board to the wireless transceiver.

2. The portable computer device of claim 1, wherein the metal layer has at least one jumper structure insulated across the circuit trace for preventing short circuit of the circuit trace.

3. The keyboard of claim 1, wherein the metal layer has at least one jumper structure insulated across the circuit trace for preventing short circuit of the circuit trace.

4. A keyboard mounted on a computer body, the computer body having a wireless transceiver and a system ground terminal, the keyboard having a keyboard ground terminal and comprising:
a bottom board;
a backlight circuit board disposed under the bottom board and electrically connected to the computer body, the backlight circuit board having a plurality of light sources and a circuit trace electrically connected to the plurality of light sources, wherein the wireless transceiver is located at a side of the backlight circuit board; and
a metal layer formed on a position of the backlight circuit board where there is no circuit trace, the metal layer being adjacent to the wireless transceiver and having a contact point formed thereon corresponding to the keyboard ground terminal, and the keyboard ground terminal being electrically connected to the contact point and the system ground terminal for suppressing electromagnetic interference of the backlight circuit board to the wireless transceiver.

5. A portable computer device comprising:
a computer body having a wireless transceiver and a system ground terminal;
a keyboard mounted on the computer body;
a backlight circuit board disposed under the keyboard and electrically connected to the computer body, the backlight circuit board having a connector corresponding to the system ground terminal and further having a plurality of light sources and a circuit trace electrically connected to the plurality of light sources, and the connector being electrically connected to the system ground terminal, wherein the wireless transceiver is located at a side of the backlight circuit board; and
a metal layer connected to the connector and formed on a position of the backlight circuit board where there is no circuit trace, the metal layer being adjacent to the wireless transceiver and electrically connected to the system ground terminal for suppressing electromagnetic interference of the backlight circuit board to the wireless transceiver.

6. The portable computer device of claim 5, wherein the metal layer has at least one jumper structure insulated across the circuit trace for preventing short circuit of the circuit trace.

7. A keyboard mounted on a computer body, the computer body having a wireless transceiver and a system ground terminal, the keyboard comprising:
a bottom board;
a backlight circuit board disposed under the bottom board and electrically connected to the computer body, the backlight circuit board having a connector corresponding to the system ground terminal and further having a plurality of light sources and a circuit trace electrically connected to the plurality of light sources, and the connector being electrically connected to the system ground terminal, wherein the wireless transceiver is located at a side of the backlight circuit board; and
a metal layer connected to the connector and formed on a position of the backlight circuit board where there is no circuit trace, the metal layer being adjacent to the wireless transceiver and electrically connected to the system ground terminal for suppressing electromagnetic interference of the backlight circuit board to the wireless transceiver.

8. The keyboard of claim 7, wherein the metal layer has at least one jumper structure insulated across the circuit trace for preventing short circuit of the circuit trace.

\* \* \* \* \*